(12) United States Patent
Bachmann et al.

(10) Patent No.: US 11,180,192 B2
(45) Date of Patent: Nov. 23, 2021

(54) VIBRATION ABSORBER RING AND AIRBAG MODULE WITH SUCH A VIBRATION ABSORBER RING

(71) Applicant: TRW Automotive Safety Systems GmbH, Aschaffenburg (DE)

(72) Inventors: Stefan Bachmann, Heimbuchenthal (DE); Joao Ribeiro, Babenhausen (DE); Marco Tumminello, Niedernberg (DE); Constantin Von Roden, Karlstein (DE); Johannes Morhart, Großostheim (DE); Christian Keschke, Aschaffenburg (DE); Gregor Eck, Kirchzell (DE); Sascha Schneider, Aschaffenburg (DE); Jurgen Burgard, Hösbach (DE)

(73) Assignee: TRW AUTOMOTIVE SAFETY SYSTEMS GMBH, Aschaffenburg (DE)

( * ) Notice: Subject to any disclaimer, the term of this patent is extended or adjusted under 35 U.S.C. 154(b) by 43 days.

(21) Appl. No.: 16/623,471

(22) PCT Filed: Aug. 24, 2017

(86) PCT No.: PCT/EP2017/071326
§ 371 (c)(1),
(2) Date: Dec. 17, 2019

(87) PCT Pub. No.: WO2019/001747
PCT Pub. Date: Jan. 3, 2019

(65) Prior Publication Data
US 2020/0189658 A1    Jun. 18, 2020

(30) Foreign Application Priority Data
Jun. 28, 2017   (DE) .................... 10 2017 114 301.7

(51) Int. Cl.
| | | |
|---|---|---|
| *B62D 7/22* | (2006.01) | |
| *B60R 21/203* | (2006.01) | |
| *B60R 21/217* | (2011.01) | |
| *B60R 21/237* | (2006.01) | |
| *B60R 21/261* | (2011.01) | |

(52) U.S. Cl.
CPC .......... *B62D 7/222* (2013.01); *B60R 21/2035* (2013.01); *B60R 21/217* (2013.01);
(Continued)

(58) Field of Classification Search
CPC ........ B60R 2021/2175; B60R 21/2035; B62D 7/222
See application file for complete search history.

(56) References Cited

U.S. PATENT DOCUMENTS

| | | | |
|---|---|---|---|
| 6,592,141 B1 | 7/2003 | Dancasius et al. | |
| 2002/0117836 A1* | 8/2002 | Asic | B60R 21/2037 280/728.2 |
| 2008/0136073 A1* | 6/2008 | Kreuzer | B60R 21/2037 267/140.11 |

FOREIGN PATENT DOCUMENTS

| | | |
|---|---|---|
| CN | 203126755 | 3/2013 |
| CN | 103192788 | 7/2013 |

(Continued)

OTHER PUBLICATIONS

Terada, Diffuser for Inflator, and Airbag Device, Dec. 5, 2013, EPO, WO 2013179844 A1, Machine Translation of Description (Year: 2013).*

(Continued)

*Primary Examiner* — James A English
*Assistant Examiner* — Matthew D Lee
(74) *Attorney, Agent, or Firm* — Tarolli, Sundheim, Covell & Tummino LLP

(57) ABSTRACT

The invention relates to a vibration absorber ring (10) for fastening a gas generator (12) to a vehicle steering wheel
(Continued)

(14), in a manner capable of vibrating, with a ring axis (A), a support portion (18) for fastening the vibration absorber ring (10) to a holding element, and an absorber portion (22) for fastening the gas generator (16) to the vibration absorber ring (10), wherein an elastic damping element (24) is provided, which extends in the axial direction from the absorber portion (22) towards a free end (26) and, between the absorber portion (22) and the free end (26), has a fastening element (28) for the gas generator (12), wherein the support portion (18) and the absorber portion (22) are spaced apart from each other in the axial direction.

17 Claims, 11 Drawing Sheets

(52) U.S. Cl.
CPC .......... *B60R 21/237* (2013.01); *B60R 21/261* (2013.01); *B60R 2021/2173* (2013.01); *B60R 2021/2178* (2013.01)

(56) References Cited

FOREIGN PATENT DOCUMENTS

| | | | | |
|---|---|---|---|---|
| CN | 205075781 U | * | 3/2016 | |
| DE | 19503816 A1 | * | 8/1996 | ......... B60R 21/2035 |
| DE | 102007049234 A1 | * | 4/2009 | ......... B60R 21/2037 |
| DE | 202014008432 U1 | * | 1/2016 | ........... B60R 21/261 |
| WO | WO-2013179844 A1 | * | 12/2013 | ........... B60R 21/261 |
| WO | WO-2019038065 A1 | * | 2/2019 | ......... B60R 21/2037 |

OTHER PUBLICATIONS

Song, Vibration Damper, Mar. 9, 2016, EPO, CN 205075781 U, Machine Translation of Description (Year: 2016).*

Hodac, Arrangement For Fixing A From A Housing Bottom And A Housing Cover Existing Airbag—Housing In The Steering Wheel, Aug. 8, 1996, EPO, DE 19503816 A1, Machine Translation of Description (Year: 1996).*

* cited by examiner

VIBRATION ABSORBER RING AND AIRBAG MODULE WITH SUCH A VIBRATION ABSORBER RING

RELATED APPLICATIONS

This application corresponds to PCT/EP2017/071326, filed Aug. 24, 2017, which claims the benefit of German Application No. 10 2017 114 301.7, filed Jun. 28, 2017, the subject matter of which are incorporated herein by reference in their entirety.

BACKGROUND OF THE INVENTION

The invention relates to a vibration absorber ring for oscillatory fastening of a gas generator on a vehicle steering wheel, comprising a ring axis, a support portion for fastening the vibration absorber ring on a retaining element, an absorber portion for fastening the gas generator on the vibration absorber ring, an elastic damping member being provided extending in the axial direction from the absorber portion to a free end and having a fastening element for the gas generator between the absorber portion and the free end.

Further, the invention also relates to an airbag module for mounting on a vehicle steering wheel comprising such vibration absorber ring.

In numerous vehicle steering wheels, vibrations which are perceived as disturbing by the driver are occurring during idling or in particular speed ranges of the vehicle. Said vibrations are due, among others, to the rigid coupling of the steering wheel to the steering column.

It is known to use so-called vibration absorbers for avoiding the undesired steering wheel vibrations in order to adjust the inherent frequency of the overall system in such a way that it is within a noncritical range. At present, for example the gas generator of an airbag module disposed within the steering wheel is used as a counter-oscillating absorber mass.

The gas generator in this case can be fastened by means of a vibration absorber ring in an oscillatory manner either directly or indirectly via a module support of the airbag module on the vehicle steering wheel. A vibration absorber ring of this type is illustrated, for example, in the generic CN 103 192 788 A.

Undesired steering wheel vibrations occurring during driving are advantageously minimized in this way. However, the airbag module requires undesirably large construction space when a vibration absorber ring according to CN 103 192 788 A is used.

SUMMARY OF THE INVENTION

Therefore, it is the object of the invention to provide an especially compact airbag module including a gas generator supported to be oscillatory.

According to the invention, this object is achieved by a vibration absorber ring of the type stated in the beginning in which the support portion and the absorber portion are spaced apart from each other in the axial direction. In particular, the support portion of the vibration absorber ring is arranged to be axially closer to the free end of the elastic damping member than the absorber portion of the vibration absorber ring. In this way, the axial height of the damping member required for vibration absorption can be materialized in the area of the absorber portion, whereas the adjacent support portion is axially "lowered" and in this way frees additional storage space for the adjacent folded airbag package. The airbag module including the gas generator supported to be oscillatory thus requires less construction space as compared to prior art and, in the ideal case, is nearly as compact as an airbag module without vibration absorber.

In one embodiment of the vibration absorber ring, plural support portions and absorber portions alternated especially in the circumferential direction of the vibration absorber ring are provided. Thus, with respect to the ring axis A, a waved course of the vibration absorber ring is resulting in the circumferential direction. For example, three or four support portions and mounting portions are given.

The elastic damping member may include, at least in portions, a hollow cross-section for the gas generator in the axial direction between the absorber portion and the fastening element. In this way, a desired frequency range can be adjusted for the vibration damper by easily adapting the damping member cross-section with little effort.

The support portion of the vibration absorber ring preferably includes a fastening means, especially a fastening aperture for receiving a connector. Possible connectors include, for example, crimped tabs of an airbag retaining plate or screwed bolts fixing the vibration absorber ring to an airbag retaining plate and/or to a generator support.

According to another embodiment of the vibration absorber ring, the support portion has a clamping area for an airbag, said clamping area especially extending substantially normal to the ring axis.

The vibration absorber ring preferably is a two-component part, especially a two-component injection-molded part, having an elastic first component forming the damping member and a second component having lower elasticity than the first component. The first component preferably is an elastic synthetic material, especially an elastomer such as rubber, whereas the second component preferably is a comparatively firm synthetic material or a metal such as steel.

The elastic first component of the vibration absorber ring preferably constitutes the clamping area of the support portion for an airbag. Between the airbag made from fabric, for example, and the clamping area, a higher friction coefficient shows for a clamping area made from elastic material than for a clamping area made from hard material. Consequently, with identical (axial) clamping force, advantageously stronger adhesion of the airbag to the vibration absorber ring is resulting for a clamping area made from the first component. In order to further increase the adhesion, it is also imaginable, for the rest, to structure, i.e. to roughen, to burl or the like, the clamping area abutting on the airbag. The airbag adhesion of a structured clamping area increased as compared to a smooth clamping area also materializes, for the rest, when the clamping area is made from the second component.

According to another embodiment, on an axial end face remote from the damping member a chamfer for deflecting a radial gas flow is provided at a radial inner edge of the vibration absorber ring. Said gas deflection allows to accelerate the filling of the airbag and to minimize undesired gas leakage.

Further, a supporting member extending in the axial direction from the absorber portion and/or from the support portion to a free supporting member end may be provided. The elastic damping member and the supporting member are arranged especially on the same axial side of the vibration absorber ring. The supporting member is preferably made from the material of the second component of the vibration absorber ring and, for example, is integrally formed with the support portion.

One independent aspect of the invention relates to a vibration absorber ring comprising a ring axis, a support portion, an absorber portion and an elastic damping member, wherein the support portion has a clamping area for an airbag and the vibration absorber ring is a two-component part including an elastic first component forming the damping member and a second component having lower elasticity than the first component, and wherein the first component forms the clamping area of the support portion. In particular, the damping member and the clamping area may integrally merge into each other. Consequently, with a minimum manufacturing effort during manufacture of the damping member at the same time also the friction coefficient of the clamping area to the airbag can be increased and thus clamping can be improved in the area of the airbag orifice.

For the rest, the invention also comprises an airbag module for mounting to a vehicle steering wheel, comprising an airbag, a gas generator and an afore-described vibration absorber ring, the elastic damping member axially extending, in the mounted condition of the airbag module, from the absorber portion in the direction of a steering wheel hub of the vehicle steering wheel. Consequently, the gas generator is suspended on the vibration absorber ring in the mounted condition of the airbag module. In other words, the gas generator is supported so that the damping member is tension-loaded in the axial direction in the mounted condition of the airbag module. When the gas generator is triggered, the damping member is additionally tension-loaded and deformed by the gas pressure. The gas generator moves in the axial direction and finally rests against a module component, e.g. a generator support of the airbag module. Said axial movement of the gas generator is also referred to as "settling" of the gas generator, which results in sealing of the airbag module and thus in reduced gas leakage. It has turned out that, with a damping member designed for vibration absorption, better module sealing is resulting when the damping member is subjected to tension rather than to pressure when the gas generator is triggered.

In a preferred embodiment of the airbag module, the support portion of the vibration absorber ring in the mounted condition of the airbag module has a smaller axial distance from the steering wheel hub than the absorber portion of the vibration absorber ring. In this way, in the area of the support portion additional storage space is formed for the adjacent folded airbag. Said additional storage space allows to realize an especially compact airbag module.

According to another embodiment, in the mounted condition of the airbag module a wall portion is provided in the area of the absorber portion radially outside the damping member for minimizing gas leakage. Said wall portion helps to prevent or at least reduce undesired flow of generator gas to the outside of the airbag module upon activation of the gas generator.

Preferably, in this embodiment a generator support is provided, with the wall portion being fastened on the generator support and extending in the axial direction from the generator support to the support portion of the vibration absorber ring. Especially, the wall portion is made from synthetic material and is attached to the generator support by injection molding so that the gas leakage can be reduced in this way with especially little manufacturing and mounting expenditure.

Especially preferred, in the circumferential direction the wall portion abuts on a respective support portion of the vibration absorber ring, the support portion overlapping the wall portion radially inside and/or radially outside of the wall portion in the circumferential direction so that a labyrinth-type sealing is formed between the vibration absorber ring and the wall portion. In other words, no radially continuous gap is provided between the support portion of the vibration absorber ring and the wall portion so that a gas flow must change directions at least once. Upon activation of the gas generator, this entails especially low loss of gas in the gap area.

BRIEF DESCRIPTION OF THE DRAWINGS

Further features and advantages of the invention will be resulting from the following description of preferred embodiments with reference to the drawings, wherein.

DESCRIPTION

FIGS. 1 through 11 illustrate an embodiment of a vibration absorber ring 10 for oscillatory fastening of a gas generator 12 on a vehicle steering wheel 14 as well as an airbag module 16 comprising such vibration absorber ring 10.

Figure 1:
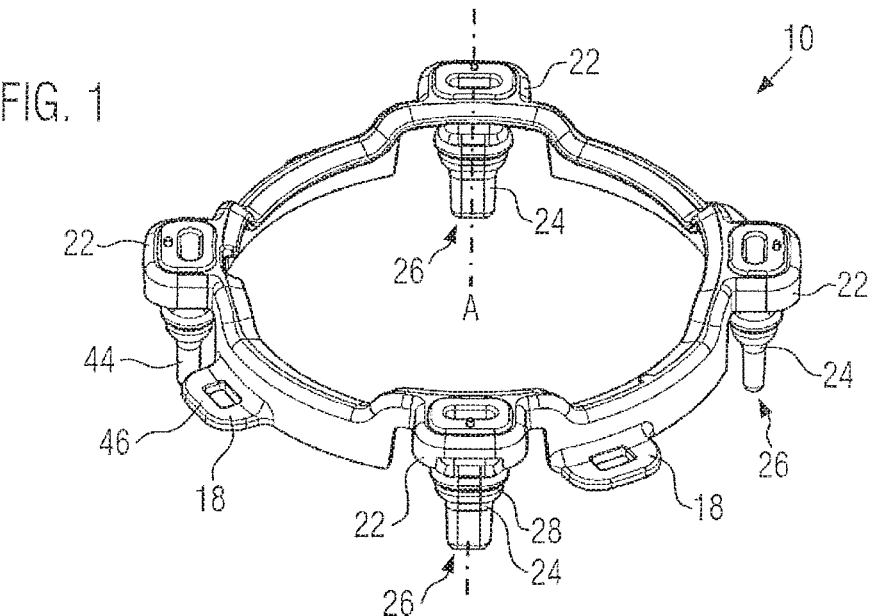
FIG. 1 shows a perspective view of a vibration absorber ring according to the invention as set forth in an embodiment.
Figure 2:
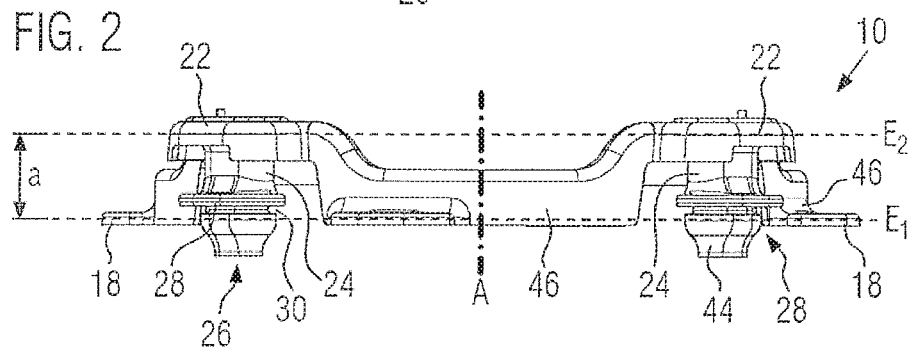
FIG. 2 shows a lateral view of the vibration absorber ring according to FIG. 1.

The vibration absorber ring 10 comprises, according to FIGS. 1 and 2, a ring axis A, a support portion 18 for fastening the vibration absorber ring 10 to a retaining element fixed to the steering wheel (see also FIG. 5), an absorber portion 22 for fastening the gas generator 12 to the vibration absorber ring 10 (see also FIG. 4), wherein there is provided an elastic damping member 24 extending with respect to the ring axis A in the axial direction from the absorber portion 22 to a free end 26 and includes a fastening element 28 for the gas generator 12 between the absorber portion 22 and the free end 26. The retaining element fixed to the steering wheel for the vibration absorber ring 10 is especially an airbag retaining plate 40 or a generator support 42 of the airbag module 16 mountable on the vehicle steering wheel 14. Alternatively, it is also imaginable for the retaining element to be an intermediate plate that is arranged between the vehicle steering wheel 14 and the airbag module 16 and can be mounted on the vehicle steering wheel 14.

The vibration absorber ring 10 of preference is a circumferentially closed, especially circular ring through the center of which the ring axis A extends, the ring axis A in the mounted condition of the airbag module 16 extending in parallel to a steering wheel axis of the vehicle steering wheel 14 and being especially identical therewith.

The vibration absorber ring 10 especially includes plural support portions 18 and absorber portions 22 alternated in the circumferential direction, wherein, in the shown example embodiment, each of four support portions 18 and four absorber portions 22 are provided. Thus, in the circumferential direction a waved extension of the vibration absorber ring including wave crests in the area of the absorber portions 22 and wave troughs in the area of the support portions 18 is resulting.

Figure 4:
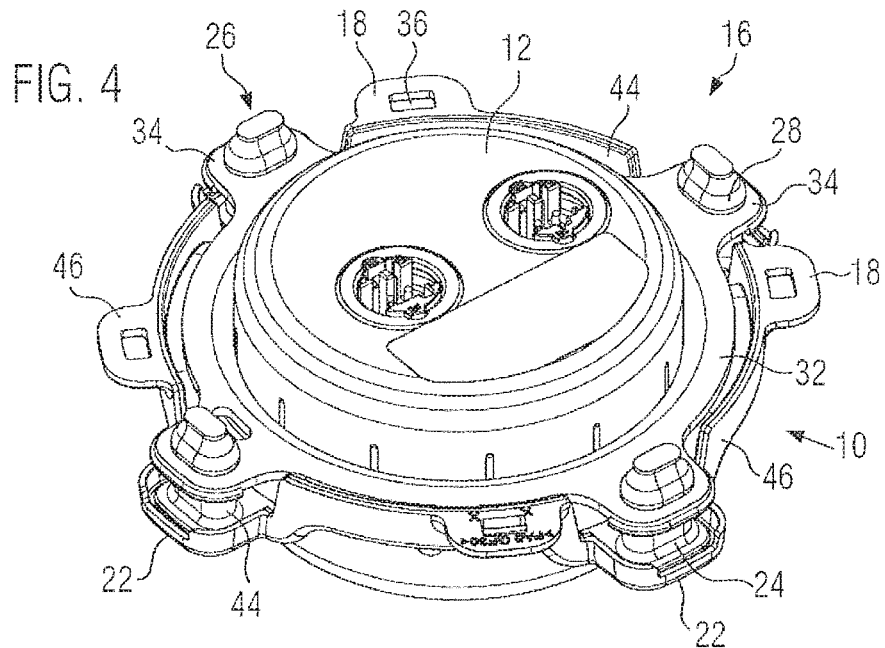
FIG. 4 shows a perspective bottom view of an airbag module according to the invention comprising a vibration absorber ring as set forth in FIG. 1 and an attached gas generator.

In the present example embodiment, the fastening element 28 is formed integrally with the damping member 24 and is configured as a damping member portion having a thickened outer cross-section and a peripheral groove 30 (FIG. 2). The gas generator 12 has a generator flange 32 with radial flange extensions 34 in each of which an opening for attaching the fastening element 28 is provided. The free ends 26 of the damping members 24 are axially inserted into said openings, until an opening edge snaps into the groove 30 while deforming the respective elastic damping member 24 in the area of the thickened outer cross-section and mounts the gas generator 12 in an oscillatory manner to the vibration absorber ring 10 (FIG. 4).

Figure 3:
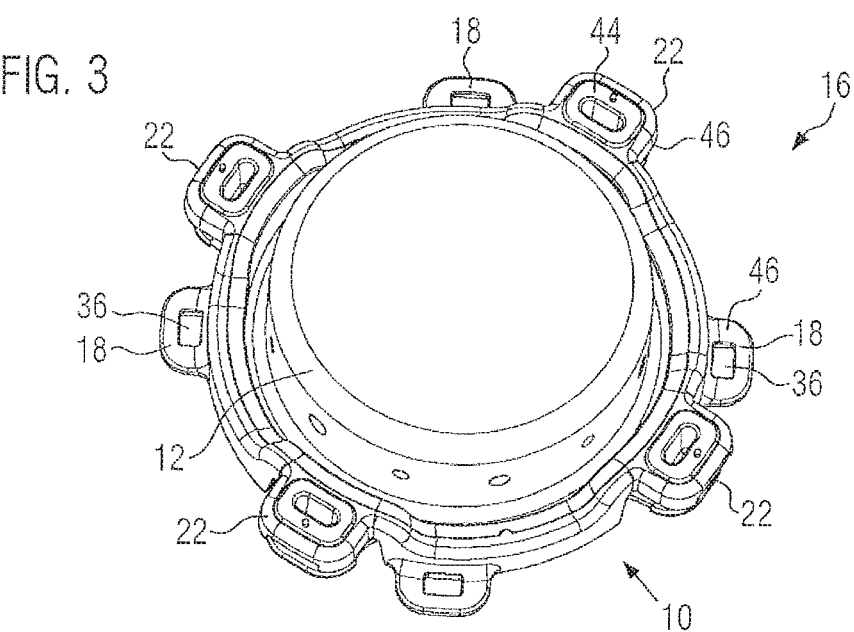
FIG. 3 shows a perspective top view of an airbag module according to the invention comprising a vibration absorber ring as set forth in FIG. 1 and an attached gas generator.
Figure 8:
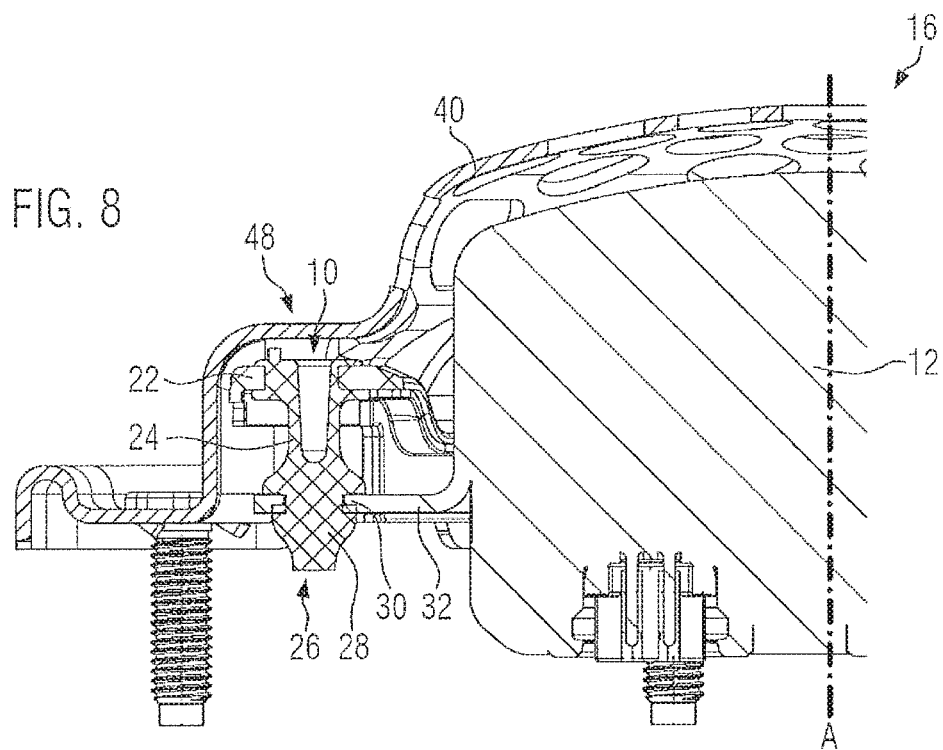
FIG. 8 shows another section across the airbag module according to FIG. 5.

It becomes apparent from FIG. 3 that the elastic damping member 24 at least in portions has a hollow cross-section between the absorber portion 22 and the fastening element 28 for the gas generator 12 (see also FIG. 8). By adapting the damping member cross-section, especially a wall thickness of the damping member hollow cross-section between the absorber portion 22 and the fastening element 28, a desired frequency range can be adjusted for the vibration absorber with little effort.

In order to materialize an especially compact design of the airbag module 16, the support portion 18 and the absorber portion 22 according to FIG. 2 are spaced apart from each other in the axial direction, an axial distance a preferably amounting to at least 3 mm, especially to at least 5 mm. In particular, all support portions 18 extend in a plane $E_1$ normal to the ring axis A and the absorber portions 22 extend in a plane $E_2$ normal to the ring axis A, the parallel planes $E_1$ and $E_2$ showing a distance a.

The support portion 18 of the vibration absorber ring 10 includes a fastening opening 36 for receiving a connector 38 so as to tightly fix the vibration absorber ring 10 to an airbag retaining plate 40 and/or to a generator support 42. Via said fastening on the airbag retaining plate 40 and/or on the generator support 42 as well as the mounting thereof fixed to the steering wheel, the vibration absorber ring 10 is finally connected tightly and undisplaceably to the vehicle steering wheel 14.

Possible connectors 38 for fastening the vibration absorber ring 10 on the support portion 18 are crimping tabs formed on the airbag retaining plate 40 (cf. FIGS. 5 and 7) or stud bolts (cf. FIGS. 16 and 18), for example.

The vibration absorber ring 10 is a two-component part having an elastic first component 44 from which the damping member 24 of the vibration absorber ring 10 is formed as well as a second component 46 having a lower elasticity than the first component 44.

Of preference, the first component 44 is an elastic synthetic material, especially an elastomer such as rubber or silicone, whereas, of preference, the second component 46 is a comparatively firm/rigid synthetic material, especially thermoplastic, or a metal such as steel. For reasons of manufacture and cost, the vibration absorber ring 10 is especially preferred to be a two-component injection molded part made from two synthetic components.

Figure 5:
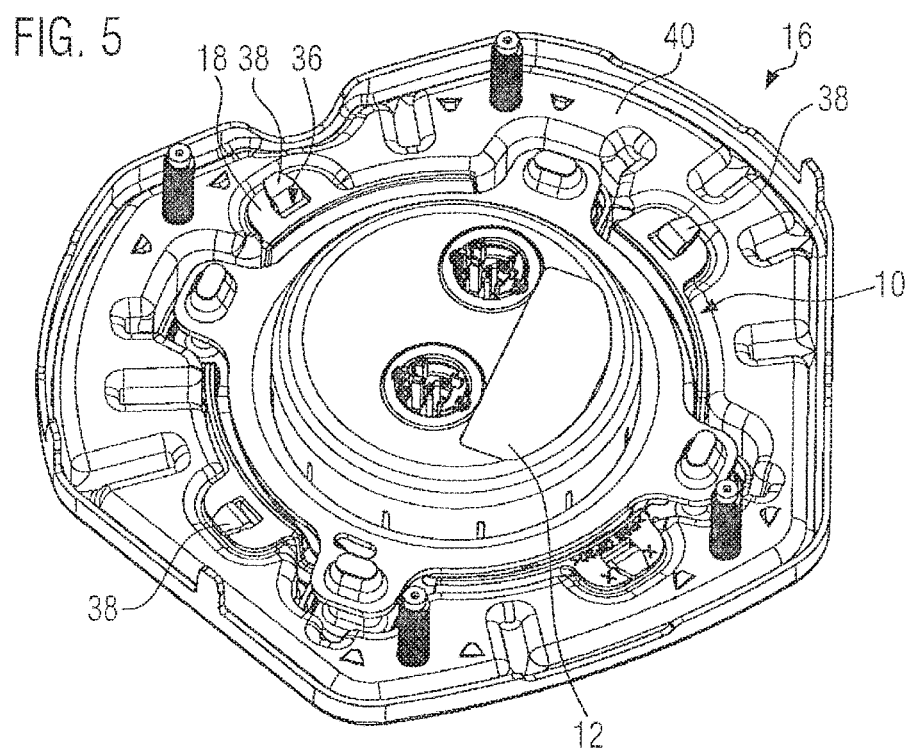
FIG. 5 shows a perspective bottom view of an airbag module according to the invention including an airbag retaining plate and a vibration absorber ring according to FIG. 1 fastened thereto.

As already mentioned before, FIGS. 3 and 4 illustrate the oscillatory fastening of the gas generator 12 on the absorber portion 22 of the vibration absorber ring 10, while in FIG. 5 the fixed connection of the airbag retaining plate 40 on the support portion 18 of the vibration absorber ring 10 is shown.

Figure 6:
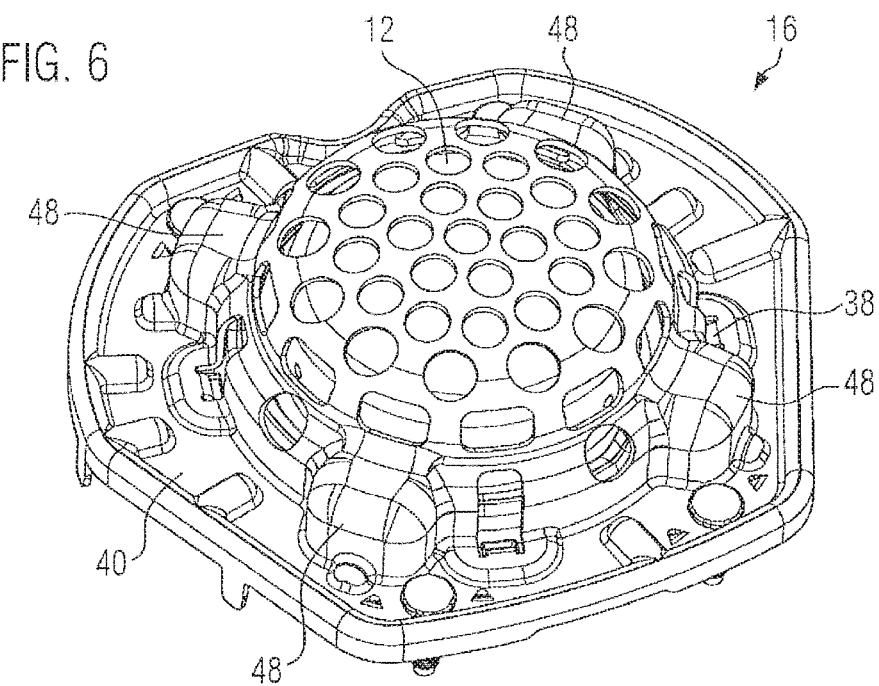
FIG. 6 shows a perspective top view of the airbag module according to FIG. 5.

It becomes evident from FIG. 6 that the airbag retaining plate 40 in the present example embodiment is a diffusor cage surrounding the gas generator 12.

Figure 7:
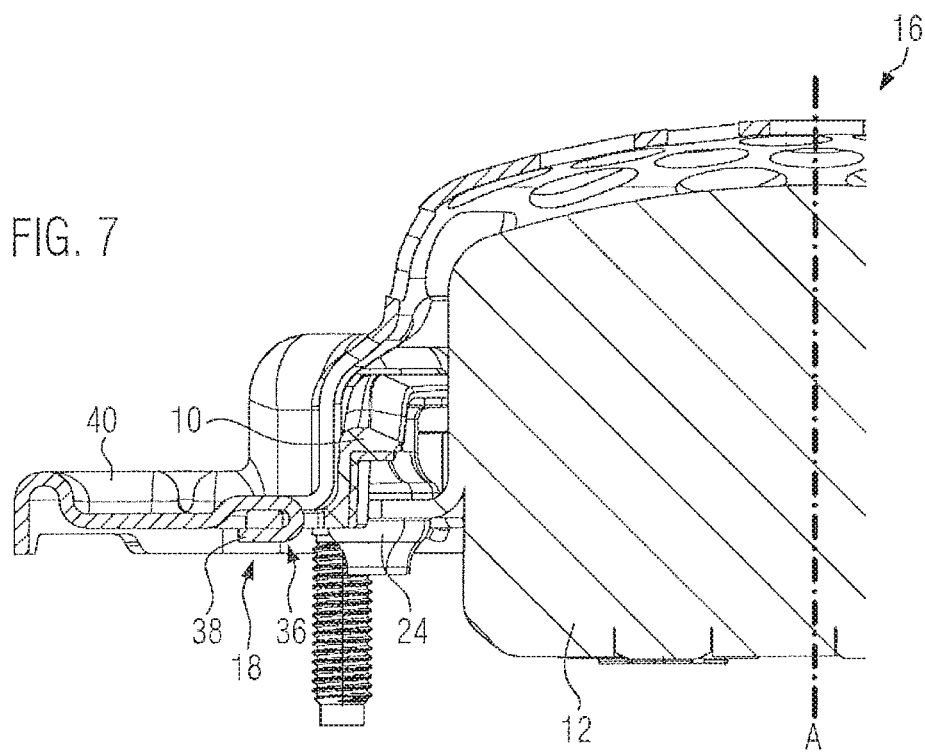
FIG. 7 shows a section across the airbag module according to FIG. 5.

FIG. 7 illustrates a section across the airbag module 16 according to FIG. 6 in the area of a fastening opening 36 of the support portion 18. The connector 38, in this case concretely a crimping tab formed on the airbag retaining plate 40, engages in the fastening opening 36 to tightly connect the vibration absorber ring 10 to the airbag retaining plate 40.

FIG. 8 illustrates a section across the airbag module 16 according to FIG. 6 in the area of a damping member 24. As compared to FIG. 7, it is striking that the vibration absorber ring 10 in this area requires increased construction space due to the damping member 24, which is also evident in FIG. 6 at respective bulges 48 of the airbag retaining plate 40 configured as diffusor cage.

The special design of the vibration absorber ring 10 with axial offset between the support portions 18 and the absorber portions 22 helps to minimize said increased space requirement, however. In this way, according to FIG. 6, a space which can be used especially as storage space for a folded airbag 50 abutting on the diffusor cage from outside is formed in the circumferential direction between the bulges 48.

Figure 9:
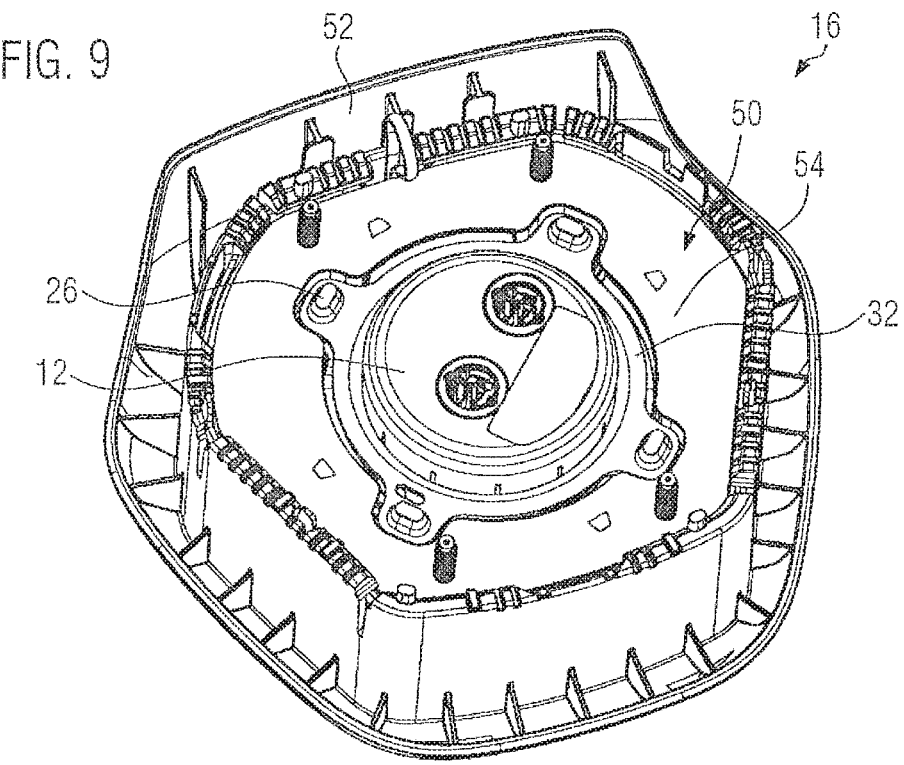
FIG. 9 shows a perspective bottom view of the airbag module according to FIG. 5 comprising an additionally provided folded airbag and a module cover.
Figure 10:
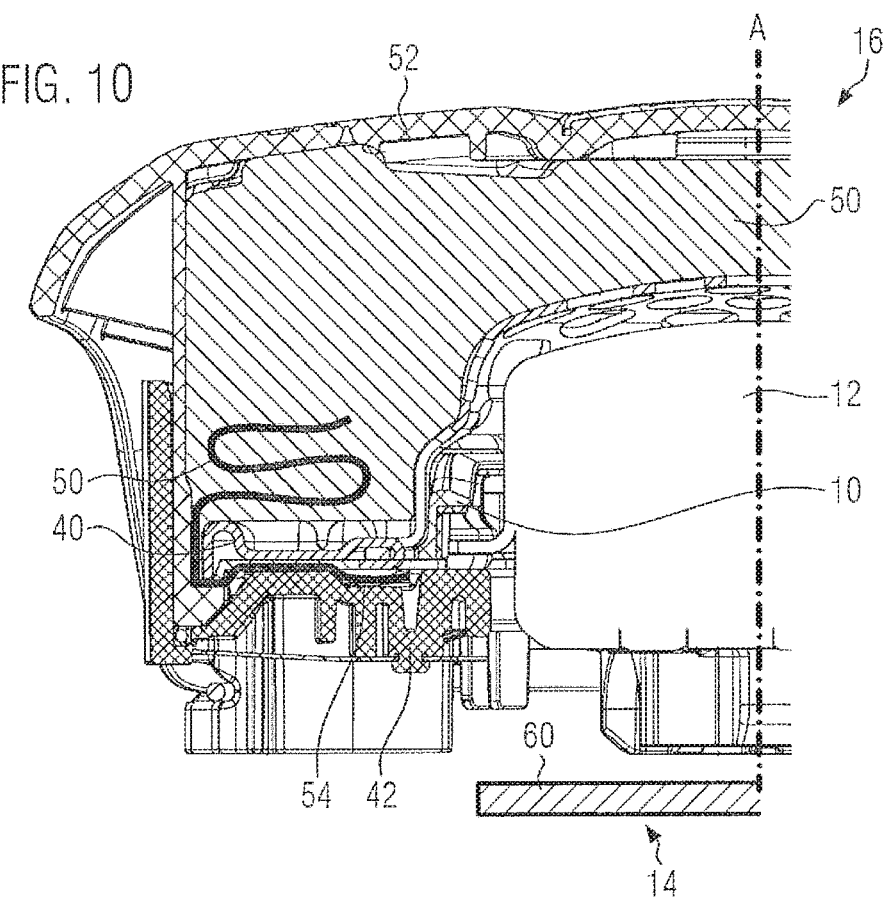
FIG. 10 shows a section across the airbag module according to FIG. 9 comprising an additionally provided generator support.

FIGS. 9 and 10 illustrate the airbag module 16 including the folded airbag 50 surrounding the diffusor cage and being received together with the diffusor cage in a module cover 52. For inflating the airbag 50, the gas generator 12 extends through an airbag orifice 54 into the interior of the airbag 50, with the airbag orifice 54 according to FIG. 10 being clamped between the airbag retaining plate 40 and the generator support 42.

Figure 11:
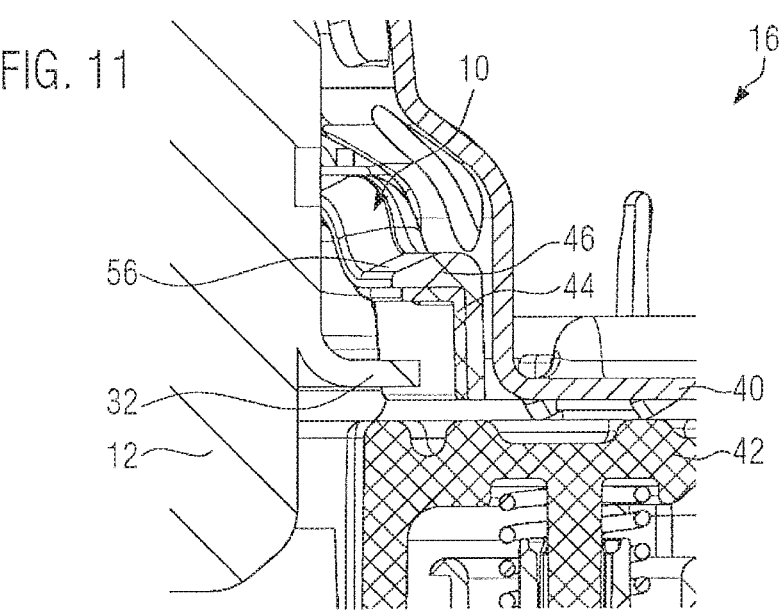
FIG. 11 shows a section detail of the airbag module according to FIG. 9 in the area of the vibration absorber ring.

In FIG. 11, a section detail of the airbag module 16 is shown in the area of the vibration absorber ring 10. It becomes apparent that on an axial end face remote from the damping member 24 at a radial inner edge of the vibration absorber ring 10 a chamfer 56 is provided for deflecting a radial gas flow (upwards according to FIG. 11). Due to said gas deflection toward the interior of the airbag 50, upon activation of the gas generator 16 undesired gas leakage is reduced.

FIGS. 12 to 17 illustrate another embodiment of the vibration absorber ring 10 for oscillatory fastening of a gas generator 12 on a vehicle steering wheel 14 as well as an airbag module 16 including such vibration absorber ring 10.

The shown vibration absorber ring 10 largely corresponds to the embodiment according to FIGS. 1 through 11 so that, in general, the foregoing remarks are referred to and, in the following, mainly differences shall be discussed.

Figure 12:
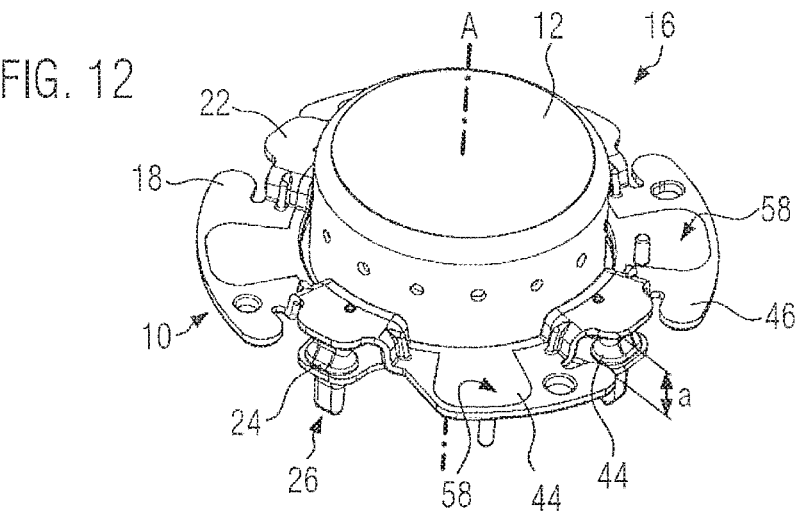
FIG. 12 shows a perspective top view of an airbag module according to the invention comprising a vibration absorber ring according to the invention as set forth in an alternative embodiment and an attached gas generator.

Analogously to FIG. 3, in FIG. 12 a vibration absorber ring 10 having a gas generator 12 fastened thereon is shown, with the vibration absorber ring 10 according to FIG. 12 substantially differing from the embodiment according to FIG. 3 by the fact that the support portion 18 includes a clamping area 58 for the airbag 50, said clamping area 58 extending substantially normal to the ring axis A.

As afore-described, the vibration absorber ring 10 is a two-component part having an elastic first component 44 from which the damping member 24 of the vibration absorber ring 10 is shaped as well as a second component 46 which has lower elasticity than the first component 44.

Another special feature of the vibration absorber ring 10 shown in FIGS. 12 to 17 consists in the fact that the elastic first component 44 of the vibration absorber ring 10 also constitutes the clamping area 58 of the support portion 18. This results in an especially high friction coefficient between the fabric of the airbag 50 and the clamping area 58 and thus especially reliable fastening of the airbag orifice 54 on the steering wheel side, when the gas generator 12 is triggered.

The idea to improve clamping of the airbag orifice 54 on the vibration absorber ring 10 by forming the clamping area 58 of the support portion 18 by the elastic first component 44 of the vibration absorber ring 10 manufactured as a two-component part is inventive already per se, irrespective of any axial distance between the support portion 18 and the absorber portion 22.

Figure 13:
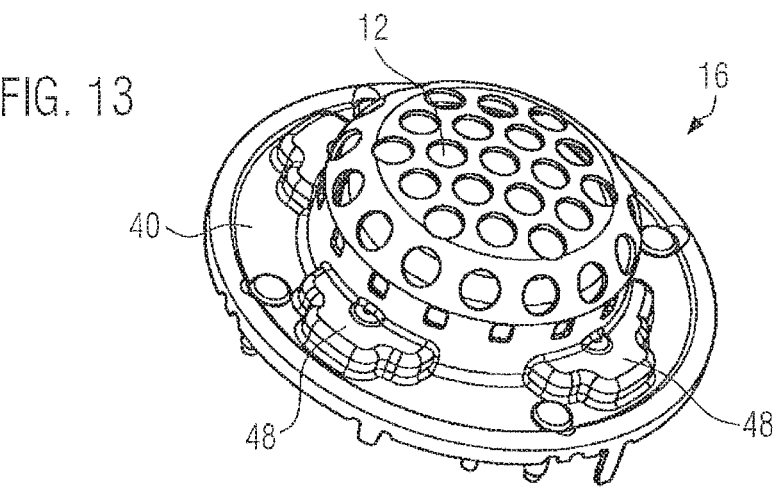
FIG. 13 shows a perspective top view of the airbag module according to FIG. 12 including an additionally provided airbag retaining plate.
Figure 14:
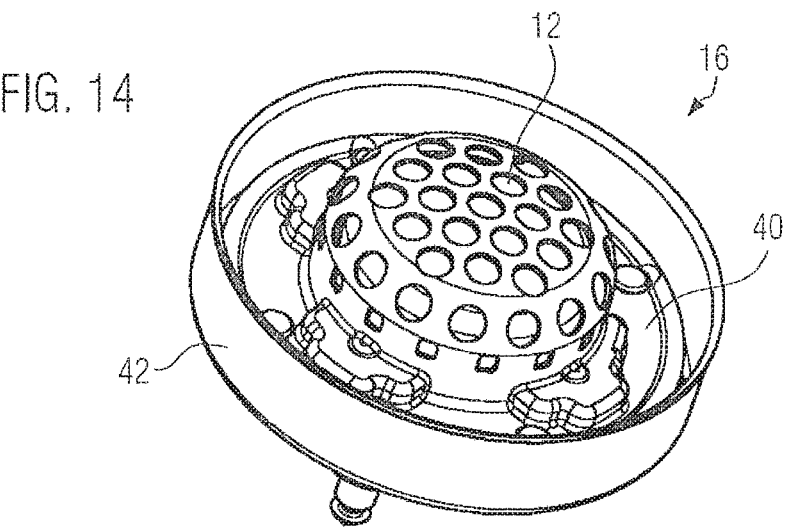
FIG. 14 shows a perspective top view of the airbag module according to FIG. 13 including an additionally provided generator support.

Based on FIG. 12, in FIG. 13 the airbag retaining plate 40 is provided in the form of a diffusor cage and in FIG. 14 furthermore the generator support 42 is provided.

Figure 15:
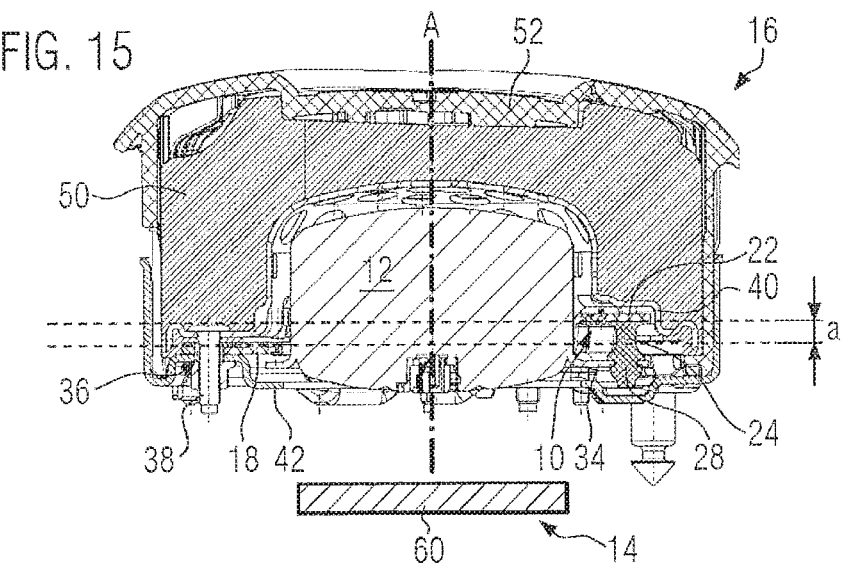
FIG. 15 shows a section across the airbag module according to FIG. 14 comprising an additionally provided folded airbag and a module cover.

FIG. 15 illustrates a section across the airbag module 16 according to FIG. 14, wherein moreover the folded airbag 50 and the module cover 52 are shown and, for the rest, also a steering wheel hub 60 of the vehicle steering wheel 14 is schematically indicated.

The elastic damping member 24 of the vibration absorber ring 10 axially extends, in the mounted condition of the airbag module 16, from the absorber portion 22 in the direction of the steering wheel hub 60 of the vehicle steering wheel 14 so that, in other words, the gas generator 12 is mounted to be suspended in the airbag module 16.

Furthermore, in the mounted condition of the airbag module 16 the support portion 18 has a smaller axial distance from the steering wheel hub 60 than the absorber portion 2 of the vibration absorber ring 10. This entails an especially compact design of the airbag module 16.

Figure 16:
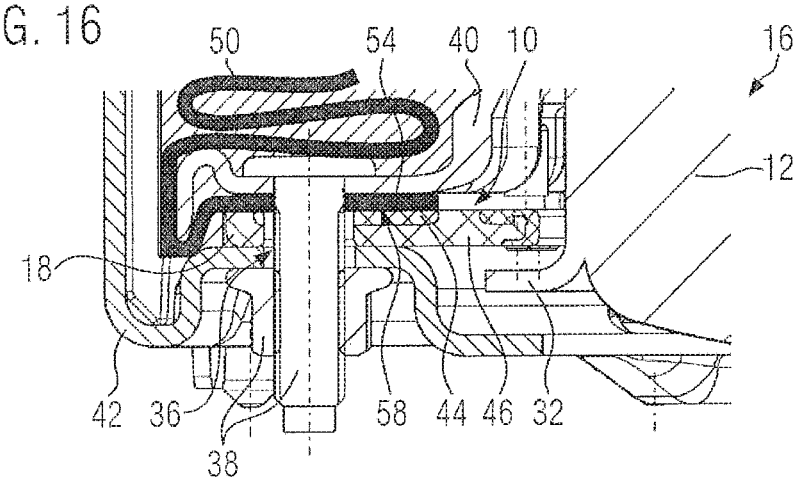
FIG. 16 shows a section detail of the airbag module from FIG. 15 in the area of a support portion of the vibration absorber ring.
Figure 17:
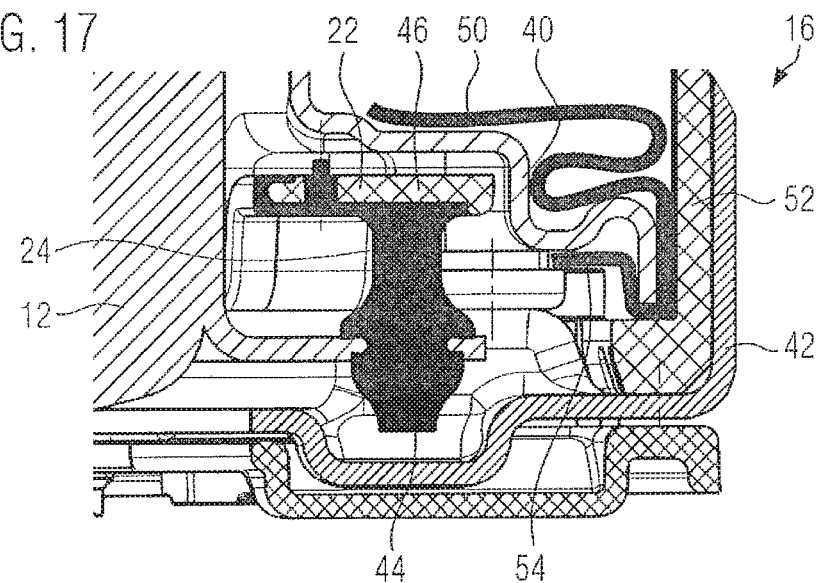
FIG. 17 shows a section detail of the airbag module from FIG. 16 in the area of an absorber portion of the vibration absorber ring.

FIGS. 16 and 17 illustrate details of FIG. 15 in the area of a support portion 18 and, resp., of an absorber portion 22 of the vibration absorber ring 10.

By way of FIG. 16 it becomes apparent that the airbag orifice 54 of the airbag 50 is clamped in the area of the support portion 18 between the vibration absorber ring 10 and the airbag retaining plate 40, with the clamping area 58 of the support portion 18 being formed by the elastic first component 44 of the vibration absorber ring 10. The clamping force in this case is applied by the connector 38 in the form of a stud bolt and a nut which axially compresses the generator support 42, the support portion 18 of the vibration absorber ring 10, the airbag 50 and the airbag retaining plate 40.

In the shown example embodiment, the airbag orifice 54 is spared in the area of the absorber portion 22 according to FIG. 17, however, so that here the airbag 50 is not clamped between the vibration absorber ring 10 and the airbag retaining plate.

Figure 18:
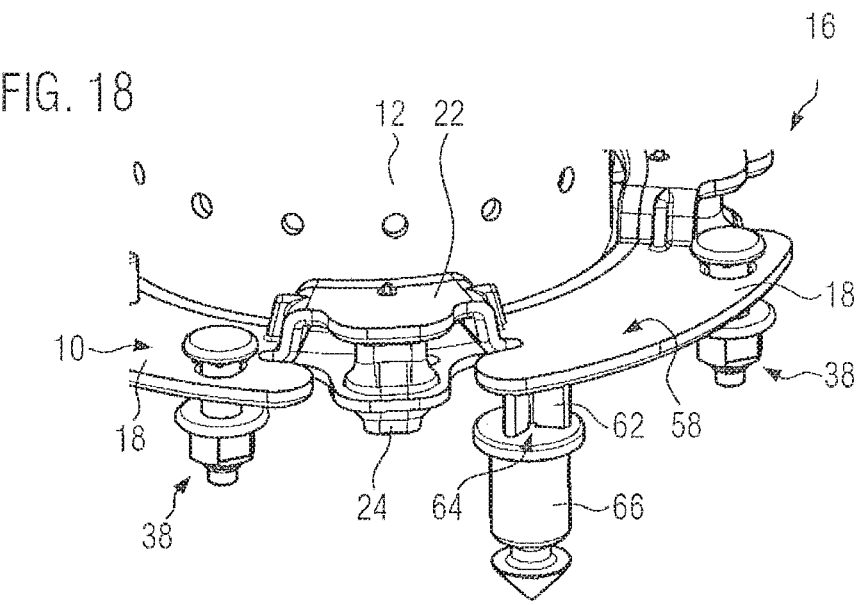
FIG. 18 shows a perspective view of an airbag module according to the invention comprising a vibration absorber ring according to the invention as set forth in an alternative embodiment and an attached gas generator.
Figure 19:
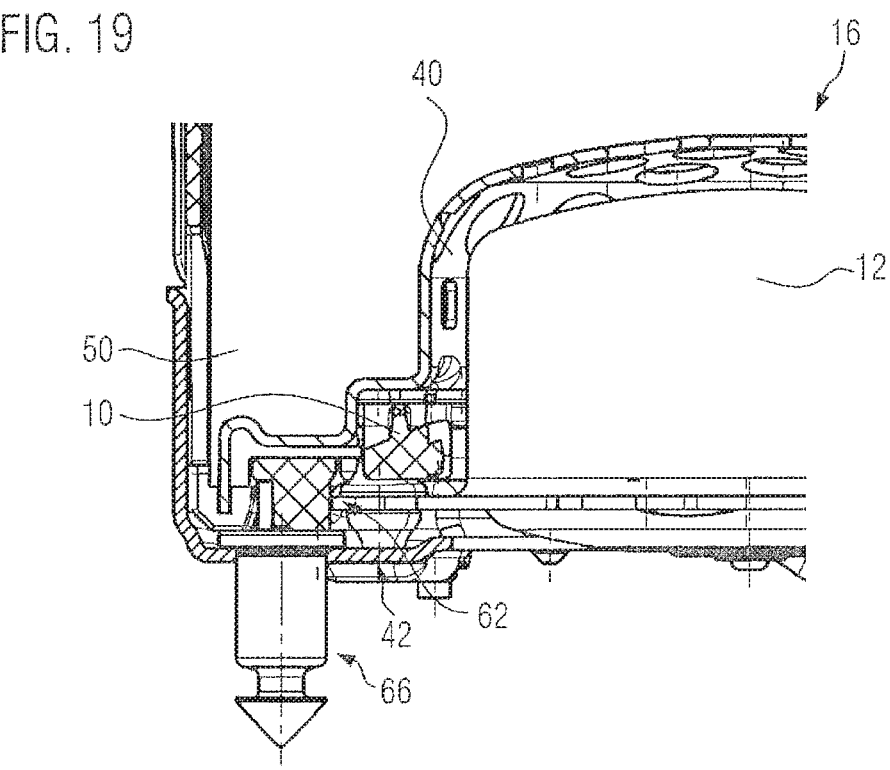
FIG. 19 shows a section detail of the airbag module from FIG. 18 in the area of a supporting member of the vibration absorber ring.

FIGS. 18 and 19 finally illustrate another embodiment of the vibration absorber ring 10 for oscillatory fastening of a gas generator 12 to a vehicle steering wheel 14 as well as an airbag module 16 comprising such vibration absorber ring 10.

The embodiment of the vibration absorber ring 10 illustrated here is different from the vibration absorber ring 10 according to FIGS. 12 to 17 substantially by the fact that at least one supporting member 62 is provided which extends in the axial direction from the support portion 18 toward a free supporting member end 64, the elastic damping member 24 and the supporting member 62 being arranged on the same axial side of the vibration absorber ring 10.

In the present example embodiment, the support member 62 is formed integrally with the support portion 18 and is configured of the substantially rigid second component 46 of the vibration absorber ring 10 in the form of a two-component part.

When the airbag module 16 is triggered, the gas pressure is axially applied to the gas generator 12 in the direction of the steering wheel hub 60. Via the fastening of the gas generator 12 on the damping members 24 axial force is applied in the direction to the steering wheel hub 60 also to the vibration absorber ring 10. Unless the support portions 18 rest on the full surface (for example on the generator support 42), said axial force may result in deformation of the vibration absorber ring 10 and thus in undesired reduced airbag clamping.

The supporting member 62 helps to provide an additional axial backing point of the vibration absorber ring 10 so that deformation of the vibration absorber ring 10 is prevented and thus reliable clamping of the airbag orifice 54 is maintained when the gas generator 12 is triggered.

The supporting member 62 is adapted to axially back the vibration absorber ring 10 especially on the generator support 42 or, as illustrated in FIGS. 18 and 19, on a press bolt 66 of the generator support 42.

Figure 20:
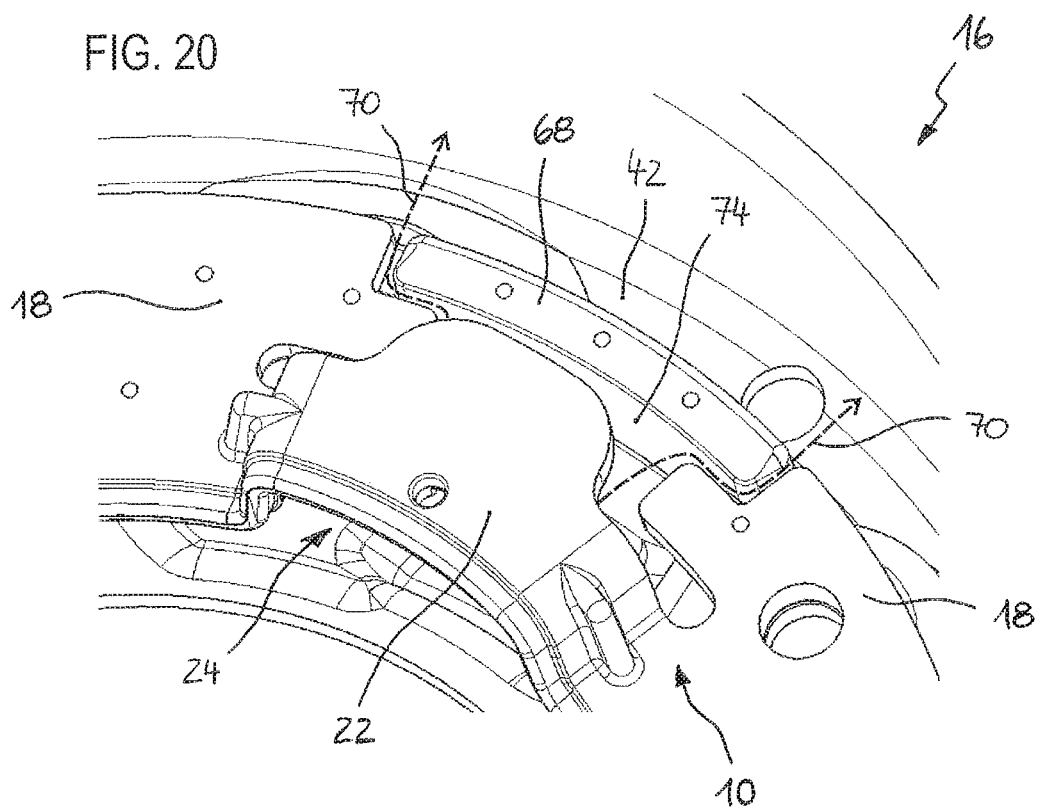
FIG. 20 shows a detail cutout of an airbag module according to the invention in the area of an absorber portion according to one embodiment.

FIG. 20 illustrates a cutout of the airbag module 16 according to another embodiment in which in the area of the absorber portion 22 radially outside of the damping member 24 a wall portion 68 for minimizing gas leakage is provided, with the wall portion 68 abutting on a respective support portion 18 of the vibration absorber ring 10 in the circumferential direction.

In order to further reduce outflow of generator gas to the outside of the airbag module 16 when the gas generator 12 is triggered, the support portion 18 overlaps the wall portion 68 radially inside the wall portion 68 in the circumferential direction so that between the vibration absorber ring 10 and the wall portion 68 there is no radially continuous gap, but a labyrinth-type sealing is formed. Although certain play is required between the vibration absorber ring 10 and the wall portion 68 in order not to impair the absorber function, proper gas sealing can be realized in this way, because a gas flow 70 indicated in FIG. 20 by broken lines has to change directions twice to leave the airbag module 16.

In FIGS. 21 to 25, yet another embodiment of the airbag module 16 is shown which substantially corresponds to the embodiment according to FIG. 20 so that the foregoing description is referred to.

Figure 21:
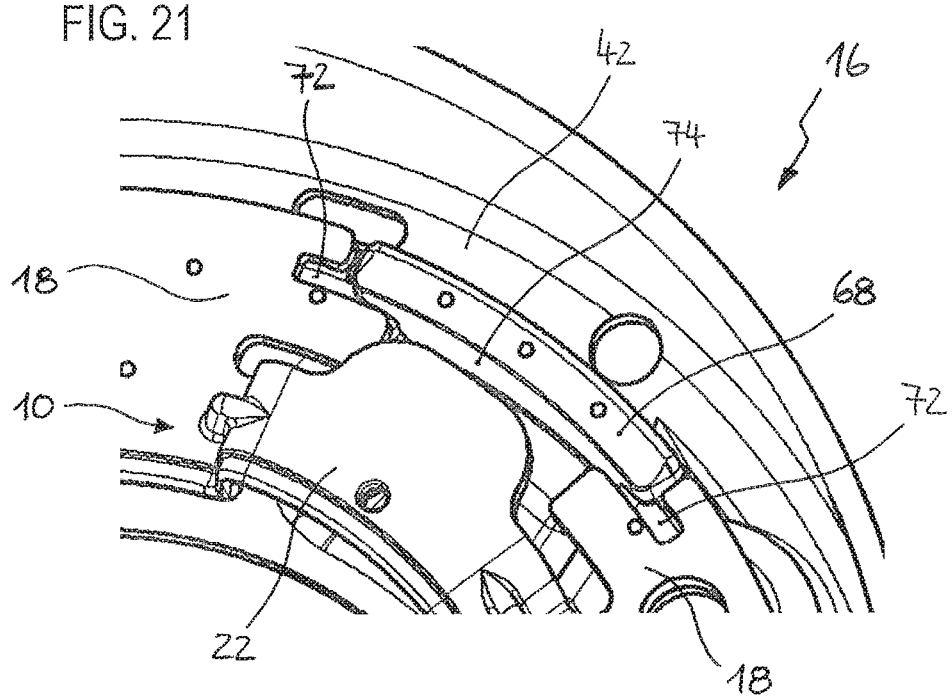
FIG. 21 shows a detail cutout from an airbag module according to the invention in the area of an absorber portion according to another embodiment.

FIG. 21 shows a cutout of the airbag module 16 analogously to FIG. 20. A comparison clearly shows that the only difference between the two embodiments consists in an additional slit 72 which is formed, according to FIG. 21, at a radial edge of the support portion 18 and extends in the circumferential direction into the support portion 18. In the radial direction the slit 72 is positioned so that it is located in the extension of a radial inner side 74 of the wall portion 68.

Analogously to FIG. 20, the gas flow 70 is deflected at the radial inner side 74 substantially to a tangential direction. However, in contrast to FIG. 20, then the major part of the gas flows into the slit 72 and is whirled there. Due to said whirl and the flow path that is defined less clearly as compared to FIG. 20, better sealing between the vibration absorber ring 10 and the wall portion 68 is resulting from said simple slit 72. Accordingly, gas leakage through the slit 72 can be further reduced with little effort.

Figure 22:
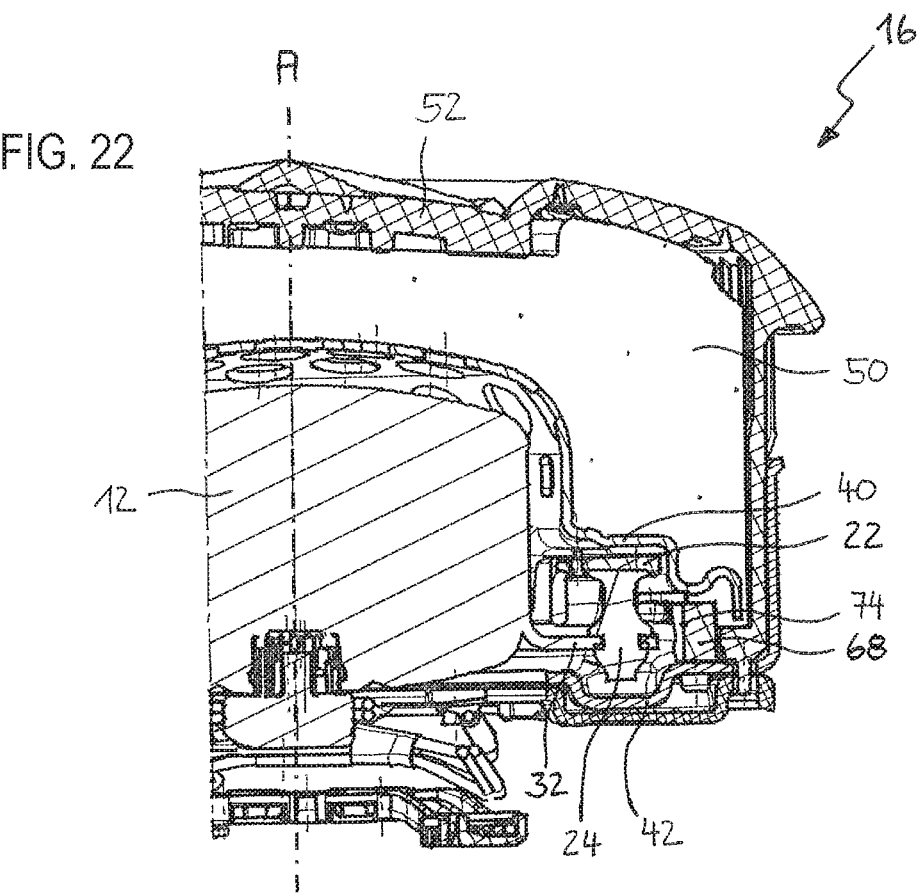
FIG. 22 shows a section across an absorber portion of the airbag module according to FIG. 21 in the mounted condition.

FIG. 22 illustrates a section across an absorber portion 22 of the completely mounted airbag module 16 according to FIG. 21. It becomes apparent here that the wall portion 68 is fastened on the generator support 42 and is arranged radially outside of the damping member 24 in the area of the absorber portion 22. The wall portion 68 extends in the axial direction from the generator support 42 to the support portion 18 of the vibration absorber ring 10 and, when the gas generator 12 is triggered, reduces gas leakage to the outside of the airbag module 16.

Preferably, exactly one wall portion 68 is assigned to each absorber portion 22 of the vibration absorber ring 10. In the shown embodiment of the airbag module 16, the vibration absorber ring 10 according to FIG. 23 includes e.g. four absorber portions 22 evenly spread in the circumferential direction to each of which one wall portion 68 is assigned.

Figure 23:
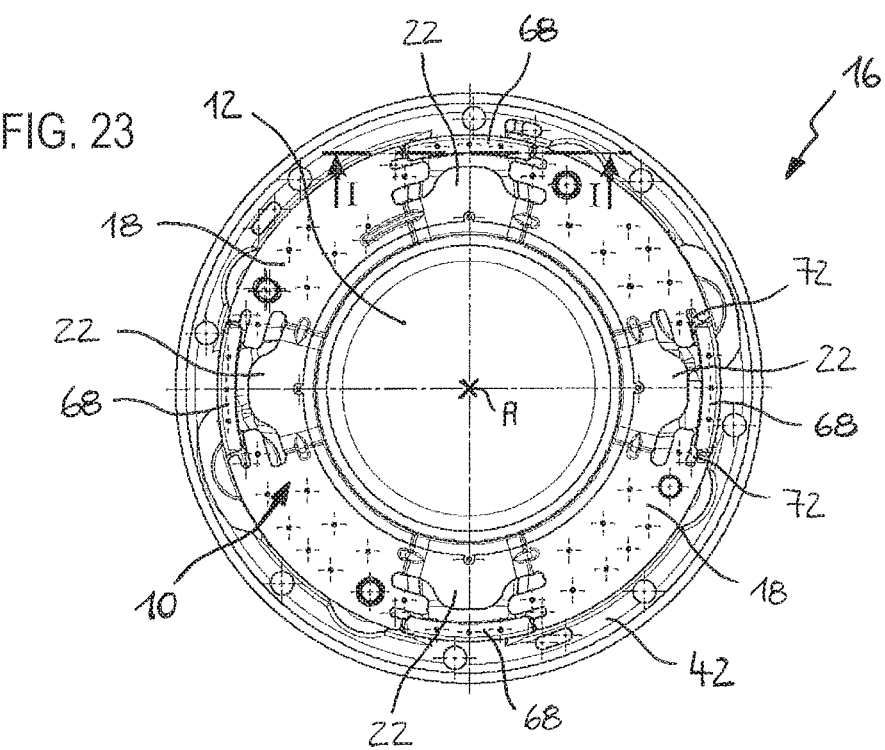
FIG. 23 shows a top view onto the airbag module according to FIG. 21.
Figure 24:
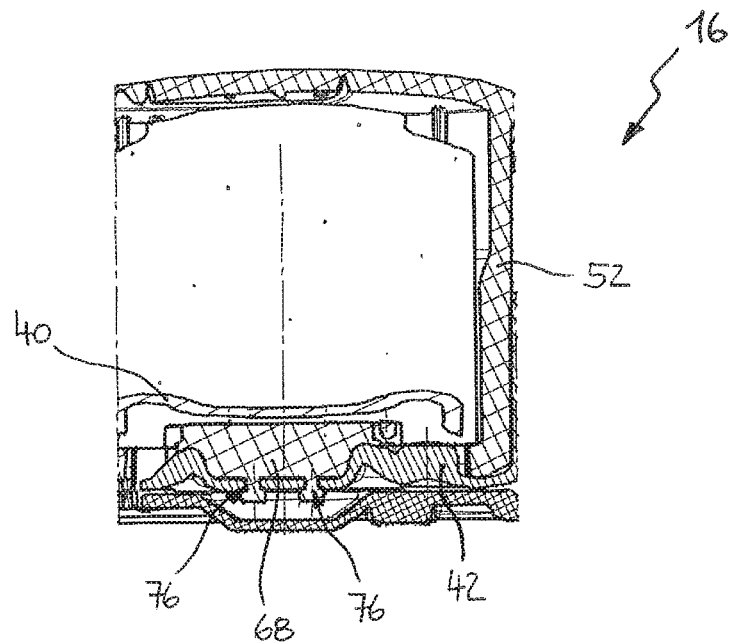
FIG. 24 shows a detail section I-I according to FIG. 23.

FIG. 24 shows a tangential detail section I-I indicated in FIG. 23 across a wall portion 68. It is clearly evident that the wall portion 68 is made from synthetic material, especially elastic synthetic material and is attached to the generator support 42 by injection molding. Concretely speaking, the synthetic material of the wall portion 68 extends through openings 76 of the generator support 42 and engages in the latter from behind. As regards manufacture and mounting, this is an especially simple option of reliably fastening the wall portions 68 on the generator support 42, wherein alternatively also other fastening variants or a one-piece design are imaginable, of course. The generator support 42 in the shown example embodiment is made from metal, wherein manufacture of stable synthetic material would also be possible, however.

Figure 25:
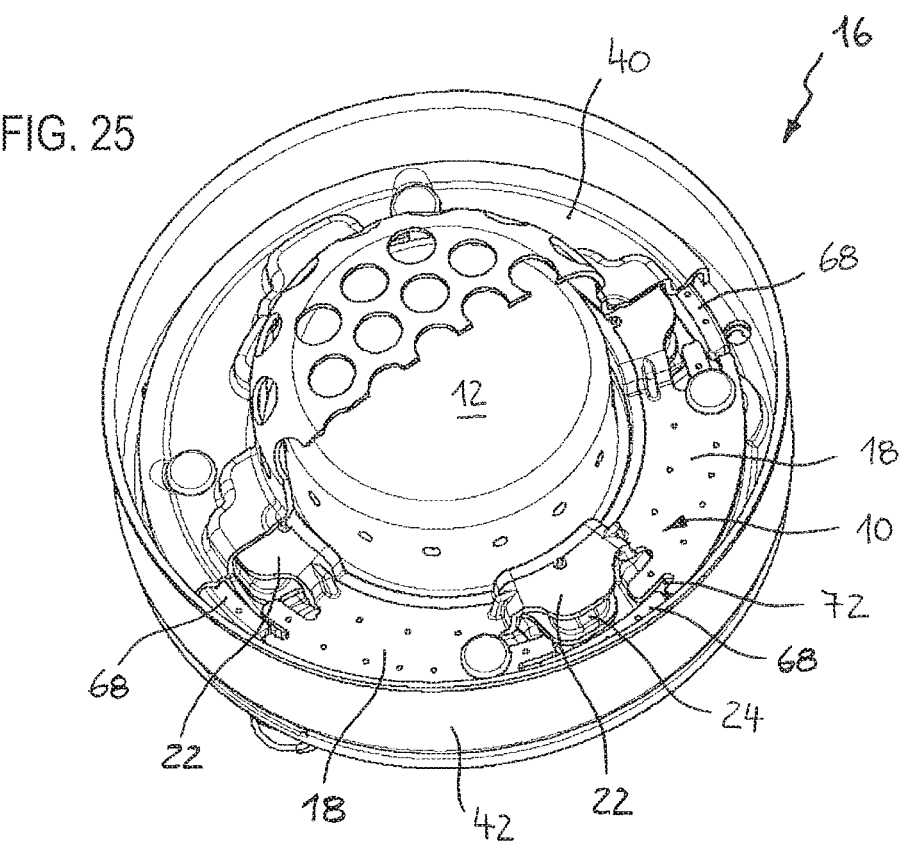
FIG. 25 shows a partly cut perspective view of the airbag module according to FIGS. 21 to 24.

FIG. 25 finally illustrates a partially cut perspective view of the airbag module 16 according to FIGS. 21 through 24 which, when the gas generator 12 is triggered, shows especially little gas leakage.

The invention claimed is:

1. An airbag module for mounting on a vehicle steering wheel (14), comprising:
   a gas generator (12); and
   a vibration absorber ring (10) for oscillatory fastening of the gas generator (12) on the vehicle steering wheel (14), the vibration absorber ring (10) comprising:
   a ring axis (A),
   a support portion (18) for fastening the vibration absorber ring (10) on a retaining element, and
   an absorber portion (22) for fastening the gas generator (12) on the vibration absorber ring (10),
   wherein an elastic damping member (24) is provided which extends in the axial direction from the absorber portion (22) to a free end (26) and between the absorber portion (22) and the free end (26) has a fastening element (28) for the gas generator (12), the elastic damping member (24) in the mounted condition of the airbag module (16) extending from the absorber portion (22) axially in the direction of a steering wheel hub (60) of the vehicle steering wheel (14),
   wherein the support portion (18) and the absorber portion (22) are spaced apart from each other in the axial direction.

2. The airbag module according to claim 1, wherein the vibration absorber ring (10) includes plural support portions (18) and plural absorber portions (22), wherein the support portions (18) and the absorber portions (22) are alternated in the circumferential direction.

3. The airbag module according to claim 1, wherein the elastic damping member (24) at least in portions has a hollow cross-section in the axial direction between the absorber portion (22) and the fastening element (28) for the gas generator (12).

4. The airbag module according to claim 1, wherein the support portion (18) has a fastening opening (36) for receiving a connector (38).

5. The airbag module according to claim 1, wherein the support portion (18) has a clamping area (58) for an airbag (50), wherein the clamping area (58) extends substantially normal to the ring axis (A).

6. The airbag module according to claim 1, wherein the vibration absorber ring (10) is a two-component part, comprising an elastic first component (44) forming the damping member (24) as well as a second component (46) having lower elasticity than the first component (44).

7. The airbag module according to claim 5, wherein the elastic first component (44) of the vibration absorber ring (10) forms the clamping area (58) of the support portion (18).

8. The airbag module according to claim 1, wherein on an axial end face remote from the damping member (24) a chamfer (56) for deflecting a radial gas flow is provided at a radial inner edge of the vibration absorber ring (10).

9. The airbag module according to claim 1, wherein at least one supporting member (62) is provided which extends in the axial direction from the support portion (18) to a free supporting member end (64), wherein the elastic damping member (24) and the supporting member (62) are arranged on the same axial side of the vibration absorber ring (10).

10. The airbag module according to claim 1, wherein the support portion (18) has a clamping area (58) for an airbag (50) and the vibration absorber ring (10) is a two-component part comprising an elastic first component (44) forming the damping member (24) as well as a second component (46) having lower elasticity than the first component (44), the first component (44) forming the clamping area (58) of the support portion (18).

11. The airbag module according to claim 1, wherein, in the mounted condition of the airbag module (16), the support portion (18) has a lower axial distance from the steering wheel hub (60) than the absorber portion (22) of the vibration absorber ring (10).

12. The airbag module according to claim 1, wherein, in the mounted condition of the airbag module (16), in the area of the absorber portion (22) radially outside of the damping member (24) a wall portion (68) is provided for minimizing gas leakage.

13. The airbag module according to claim 12, wherein a generator support (42) is provided, wherein the wall portion (68) is fastened on the generator support (42) and extends in the axial direction from the generator support (42) to the support portion (18) of the vibration absorber ring (10).

14. The airbag module according to claim 12, wherein in the circumferential direction the wall portion (68) abuts on a respective support portion (18) of the vibration absorber ring (10), wherein the support portion (18) overlaps the wall portion (68) radially inside and/or radially outside of the wall portion (68) in the circumferential direction so that a labyrinth-type sealing is formed between the vibration absorber ring (10) and the wall portion (68).

15. A vibration absorber ring for oscillatory fastening of a gas generator (12) on a vehicle steering wheel (14), comprising:
a ring axis (A);
a support portion (18) for fastening the vibration absorber ring (10) on a retaining element, the support portion (18) has a clamping area (58) for an airbag (50), the clamping area (58) extends substantially normal to the ring axis (A);
an absorber portion (22) for fastening the gas generator (12) on the vibration absorber ring (10), the absorber portion (22) and the support portion (18) being spaced apart from each other in the axial direction; and
an elastic damping member (24) which extends in the axial direction from the absorber portion (22) to a free end (26), the elastic damping member (24) having a fastening element (28) for the gas generator (12) between the absorber portion (22) and the free end (26).

16. A vibration absorber ring for oscillatory fastening of a gas generator (12) on a vehicle steering wheel (14), comprising:
a ring axis (A);
a support portion (18) for fastening the vibration absorber ring (10) on a retaining element;
an absorber portion (22) for fastening the gas generator (12) on the vibration absorber ring (10), the absorber portion (22) and the support portion (18) being spaced apart from each other in the axial direction;
an elastic damping member (24) which extends in the axial direction from the absorber portion (22) to a free end (26), the elastic damping member (24) having a fastening element (28) for the gas generator (12) between the absorber portion (22) and the free end (26); and
a chamfer (56) for deflecting a radial gas flow provided on an axial end face remote from the damping member (24) and at a radial inner edge of the vibration absorber ring (10).

17. A vibration absorber ring for oscillatory fastening of a gas generator (12) on a vehicle steering wheel (14), comprising:
a ring axis (A);
a support portion (18) for fastening the vibration absorber ring (10) on a retaining element, the support portion (18) having a clamping area (58) for an airbag (50);
an absorber portion (22) for fastening the gas generator (12) on the vibration absorber ring (10), the absorber portion (22) and the support portion (18) being spaced apart from each other in the axial direction; and
an elastic damping member (24) which extends in the axial direction from the absorber portion (22) to a free end (26), the elastic damping member (24) having a fastening element (28) for the gas generator (12) between the absorber portion (22) and the free end (26);
wherein the vibration absorber ring (10) is a two-component part comprising an elastic first component (44) forming the damping member (24) as well as a second component (46) having lower elasticity than the first component (44), the first component (44) forming the clamping area (58) of the support portion (18).

* * * * *